US 6,655,642 B1

(12) United States Patent
Zearbaugh

(10) Patent No.: US 6,655,642 B1
(45) Date of Patent: Dec. 2, 2003

(54) SINGLE PIECE MACHINED STRAP CLAMP

(75) Inventor: Scott R. Zearbaugh, Milford, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/410,240

(22) Filed: Sep. 30, 1999

(51) Int. Cl.$^7$ ................................................. F16L 3/08
(52) U.S. Cl. ........................................................ 248/65
(58) Field of Search ........................ 248/65, 67.7, 68.1, 248/69, 70, 71, 72, 73, 74.1, 74.4, 223.41, 224.51, 224.61, 221.4, 340, 345.1, 317; 403/381, 331; 285/420; 211/70.4, 70.6

(56) References Cited

U.S. PATENT DOCUMENTS

| 448,550 | A | * | 3/1891 | Scott ............................ 248/65 |
| 453,860 | A | * | 6/1891 | Francis ........................ 403/381 |
| 622,739 | A | * | 3/1899 | Wahlert ...................... 248/74.4 |
| 917,891 | A | * | 4/1909 | Pflager ......................... 248/65 |
| 938,216 | A | * | 10/1909 | Cook ............................ 248/65 |
| 1,322,414 | A | * | 11/1919 | Elkins ......................... 248/74.4 |
| 1,455,609 | A | * | 5/1923 | Hannaford .................. 248/65 |
| 2,368,619 | A | * | 2/1945 | Soderberg ................... 248/65 |
| 2,546,792 | A | * | 3/1951 | Smith et al. ................. 248/65 |
| 2,714,496 | A | * | 8/1955 | Doyle .......................... 248/65 |
| 2,955,790 | A | * | 10/1960 | Sylvester ..................... 248/65 |
| 3,414,219 | A | * | 12/1968 | Siegel .......................... 248/65 |
| 4,019,638 | A | * | 4/1977 | Miller ......................... 248/317 |
| 4,090,796 | A | * | 5/1978 | Okuda et al. ............... 403/381 |
| 4,300,271 | A | * | 11/1981 | Wohlhaupter .............. 403/381 |
| 4,373,401 | A | * | 2/1983 | Baumoel ..................... 310/327 |
| 4,481,269 | A | * | 11/1984 | Barrett, Jr. .................. 248/74.1 |
| 4,555,083 | A | * | 11/1985 | Carter ......................... 403/381 |
| 4,676,472 | A | * | 6/1987 | Kamrud, Sr. ............ 248/74.4 X |
| 4,804,158 | A | * | 2/1989 | Collins et al. .............. 248/74.4 |
| 5,040,753 | A | | 8/1991 | Roth |
| 5,054,159 | A | * | 10/1991 | Richardson ................ 15/393 |
| 5,058,843 | A | * | 10/1991 | Koster ....................... 248/221.4 |
| 5,269,486 | A | * | 12/1993 | Hufford ...................... 248/74.4 |
| 5,292,013 | A | * | 3/1994 | Earl ............................. 248/73 |
| 5,441,220 | A | | 8/1995 | Carlson |
| 5,468,092 | A | * | 11/1995 | Saunders .................... 248/74.4 |
| D393,747 | S | | 4/1998 | Salvucci, Sr. |
| 5,794,897 | A | * | 8/1998 | Jobin et al. ................ 248/74.4 |
| 5,904,325 | A | * | 5/1999 | Hung ......................... 248/74.4 |
| 5,996,945 | A | * | 12/1999 | Coles et al. ................ 248/68.1 |
| D420,277 | S | | 2/2000 | Burke et al. |
| 6,070,745 | A | * | 6/2000 | Dembicks ................... 206/378 |
| 6,193,015 | B1 | | 2/2001 | Kato et al. |
| 6,353,960 | B1 | * | 3/2002 | Jannicelli, Jr. ............. 15/106 |

FOREIGN PATENT DOCUMENTS

GB          443503      *  3/1936    .................. 248/65

* cited by examiner

Primary Examiner—Blair M. Johnson
Assistant Examiner—Jennifer E. Novosad
(74) Attorney, Agent, or Firm—William Scott Andes; Armstrong Teasdale LLP; Robert B. Reeser, III

(57) ABSTRACT

A strap clamp secures tubing to an aircraft engine housing. The clamp includes a first portion with a first thickness and a second portion unilaterally extending from the first portion and, with a second thickness. The clamp is flexible and is capable of being formed around the tubing to be secured. The clamp includes a plurality of apertures which receive threaded connectors used to secure the clamp.

12 Claims, 3 Drawing Sheets

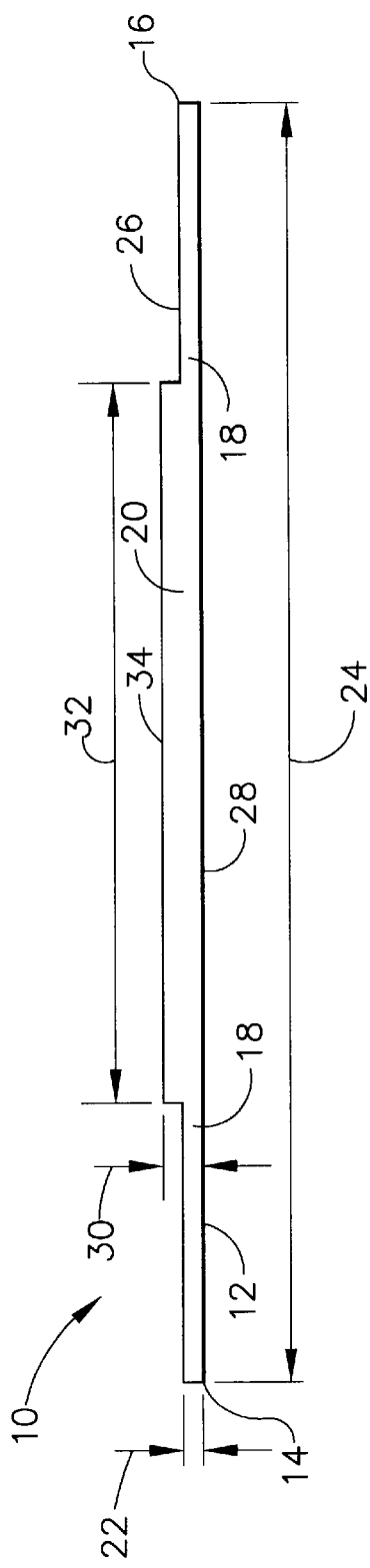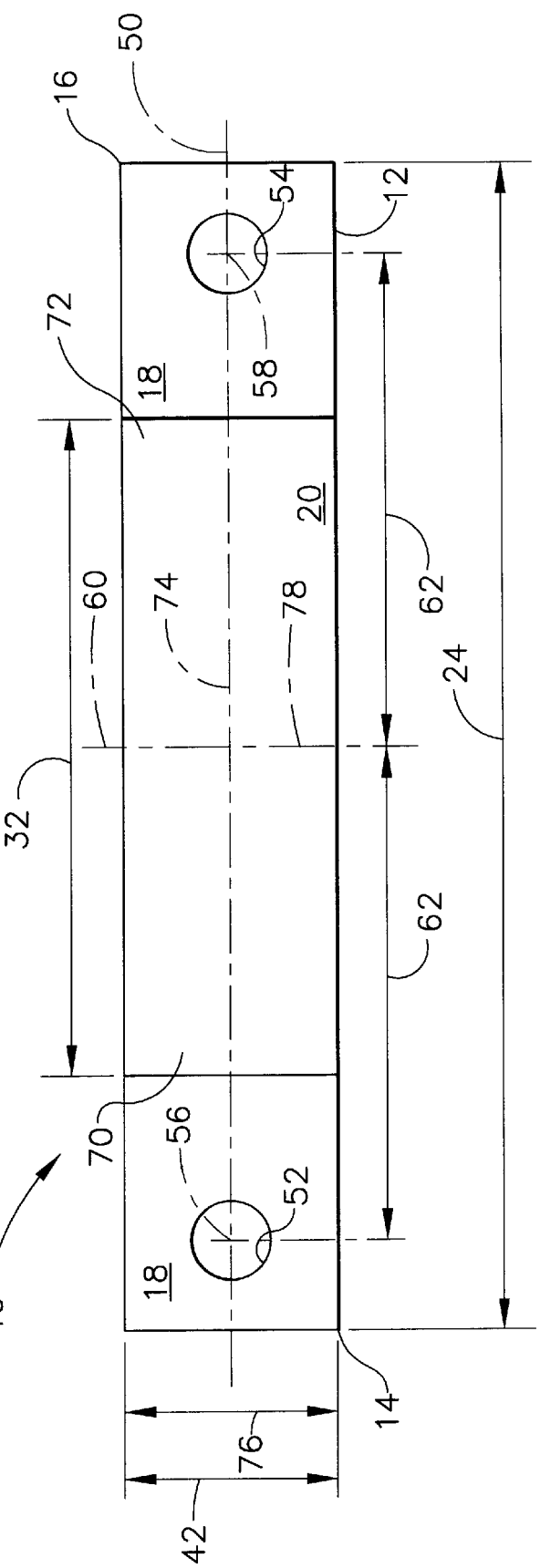

_US 6,655,642 B1_

SINGLE PIECE MACHINED STRAP CLAMP

BACKGROUND OF THE INVENTION

This invention relates generally to clamps and, more particularly, to strap clamps for securing tubing to an aircraft engine housing.

Aircraft engine assemblies require a vast number of pipes and tubes to be connected between components. The tubing and piping is often routed in a space located between an aircraft engine housing and an aircraft engine cowling. Although isolated, this area is still subjected to the high temperatures and high vibrations operated by the aircraft engine. As a result, any clamp assemblies securing tubing in these areas are also subjected to the high temperatures and high vibrations. Typically these clamp assemblies include a bracket assembly anchored to the aircraft engine housing, and a clamp positioned around the tubing to be anchored and attached to the bracket assembly. Because the bracket assembly is typically secured more rigidly to the aircraft engine housing than the clamp is capable of being secured to the bracket, the clamp is subjected to much more stress than the clamp bracket.

Clamping systems typically utilize a multi-piece clamp which consists of a flat base member and an upper member welded to the base member. Often the upper member is pre-formed to fit around a specific outer diameter of piping to be anchored. Additionally, often the lower member is also pre-formed to receive a specific outer diameter of piping. A problem with known clamps is that under the high vibrations encountered by the clamping assemblies, the clamps have a tendency to crack and fail due to vibrational fatigue. In particular, those clamps that are pre-formed have a tendency to fail at a location near the apex of the pre-formed bend or at any of the weld locations between the members. In some instances, these failures lead to failure of the base member and eventually to a failure of the particular tubing being secured to the housing.

BRIEF SUMMARY OF THE INVENTION

In an exemplary embodiment of the invention, a lower strap clamp installs easily, is reliable, and is resilient to vibrations induced by an aircraft engine.

The lower strap clamp includes an elongate body having a unitary first portion and a second portion. The first portion has a first thickness and the second portion has a second thickness which is thicker than the first thickness. The elongate body is rigid and remains flat when tubing is anchored to it. The second portion is generally rectangular shaped and extends from the first portion. Since the second portion is unitary with the first portion, no welds are utilized on the strap clamp. The lower strap clamp includes a plurality of apertures which receive threaded connectors used to anchor the strap clamp to a structure.

During assembly, a wear sleeve is attached and encircles the tubing being anchored. An upper strap includes a plurality of openings and is bent and formed around the tubing such that the openings on the upper strap clamp align with the apertures on the lower strap clamp. The fasteners pass through the upper strap clamp and extend through the lower clamp bracket to anchor the tubing to the structure. As a result, the risk of the lower clamp failing due to the high vibrations induced by the aircraft engine is minimized.

BRIEF DESCRIPTION OF THE DRAWINGS

FIG. 1 is a side elevational view of a strap clamp;

FIG. 2 is a plan view of the strap clamp shown in FIG. 1;

DETAILED DESCRIPTION OF THE INVENTION

Figure 3:
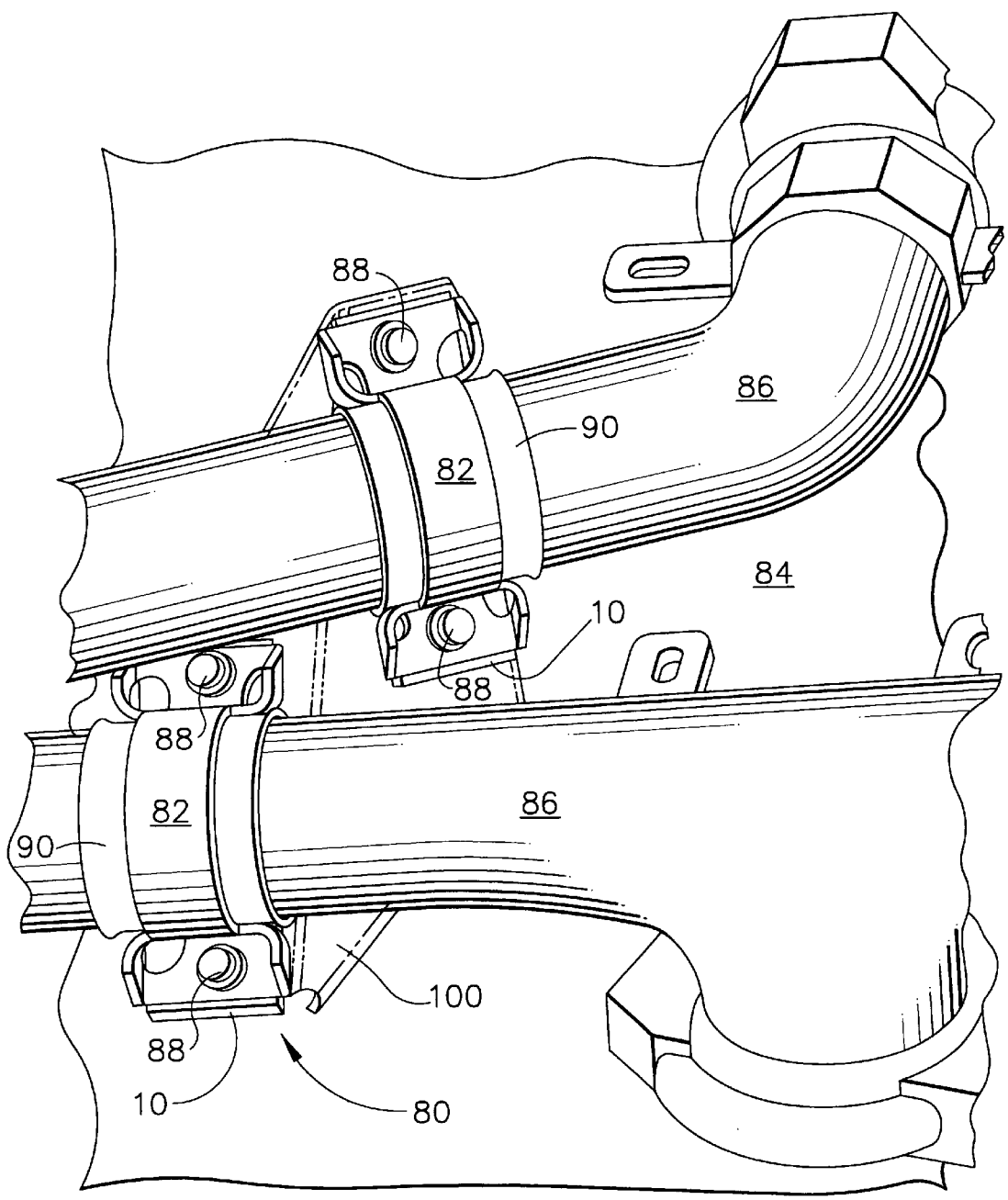
FIG. 3 is a partial perspective view of a clamping assembly including the strap clamp shown in FIG. 1.

FIG. 1 is a side elevational view of a strap clamp 10 including an elongate body 12 which has a first end 14 and a second end 16. Elongate body 12 is rigid and is substantially flat. As such, first end 14 and second end 16 are substantially co-planar. In one embodiment, elongate body 12 is machined from a metal such as stainless steel. Alternatively, elongate body is machined from titanium or inconel. Strap clamp 10 is utilized to anchor a tubing (not shown in FIG. 1) to an aircraft engine housing (not shown in FIG. 1). In one embodiment, strap clamp 10 is utilized to anchor tubing having an outside diameter of 2.5 inches.

Elongate body 12 is unitary and includes a first portion 18 and a second portion 20 extending from first portion 18. First portion 18 has a first thickness 22, a length 24, and a width (not shown in FIG. 1). Thickness 22 is substantially constant within first portion 18. First portion 18 is generally rectangular in shape and includes a top surface 26, a bottom surface 28, and a length 29. Strap clamp 10 is rigid and remains flat when installed. In one embodiment, length 29 is approximately 0.9 inches. Top surface 26 is generally parallel to bottom surface 28. Second portion 20 has a thickness 30, a length 32, and a width (not shown in FIG. 1). Second portion thickness 30 is substantially constant within second portion 20 and is thicker than first portion thickness 22. In one embodiment, elongate body 12 is machined such that first portion thickness 22 is about 0.063 inches and second portion thickness 30 is about 0.125 inches. Second portion 20 is generally rectangular in shape and includes a top surface 34 which is generally parallel to bottom surface 28.

FIG. 2 is a plan view of strap clamp 10. Strap clamp 10 includes elongate body 12 which is generally rectangular in shape. Elongate body 12 includes first portion 18 and second portion 20. First portion 18 extends from first end 14 to second end 16 and has a length 24 and a width 42. In one embodiment, length 24 is approximately 4.118 inches and width 42 is approximately 0.75 inches. First portion 18 also includes an axis of symmetry 50 which extends from first end 14 to second end 16. An aperture 52 is disposed within first portion 18 adjacent first end 14 and a second aperture 54 is disposed within first portion 18 adjacent second end 16. Aperture 52 includes a center 56 and second aperture 54 includes a center 58. First portion 18 includes a second axis of symmetry 60 which is perpendicular to axis of symmetry 50. Center 56 and center 58 are positioned on axis of symmetry 50, each a distance 62 from axis of symmetry 60. In one embodiment distance 62 is approximately 1.739 inches. Apertures 52 and 54 are substantially the same size and in one embodiment each has a diameter of approximately 0.281 inches.

Second portion 20 is generally rectangular in shape and includes a first end 70, a second end 72, and an axis of symmetry 74 which extends from first end 70 to second end 72. Second portion 20 includes length 32 and a width 76. Length 32 is less than length 24 and width 76 is substantially equal to width 42. In one embodiment, strap clamp 10 is machined such that length 32 is approximately 2.318 inches and width 76 is approximately 0.75 inches. Second portion 20 includes a second axis of symmetry 78 which is perpendicular to axis of symmetry 74. Strap clamp 10 is machined such that second portion 20 is centered on first portion 18 such that axis of symmetry 74 is co-axial with axis of symmetry 50 and axis of symmetry 78 is co-axial with axis of symmetry 60.

FIG. 3 is a perspective view of a clamping assembly 80 including lower strap clamp 10 and upper strap clamp 82. Lower strap clamp 10 remains flat and is positioned above a clamp bracket (not shown in FIG. 3) which is anchored to an aircraft engine housing 84. A plurality of tubing and piping 86 traverse housing 84 leading to various aircraft engine components (not shown). Clamping assembly 80 is utilized to anchor tubing 86 to housing 84. Upper strap clamp bracket 82 includes a pair of apertures (not shown) which threaded fasteners 88 extend through to secure upper clamp bracket 82 to lower strap clamp 10.

In operation, a wear sleeve 90 is installed around tubing 86 to provide additional wearing protection to tubing 86 in those areas which are anchored to aircraft engine housing 84. Upper strap clamp 82 is bent to conform to tubing 86 and is form fit over wear sleeve 90 such that the respective openings positioned within upper strap clamp 82 are in alignment with apertures 52 and 54. Threaded fasteners 88 pass through upper strap clamp 82, strap clamp 10, and through the clamp bracket to tighten to housing 84.

Figure 4:
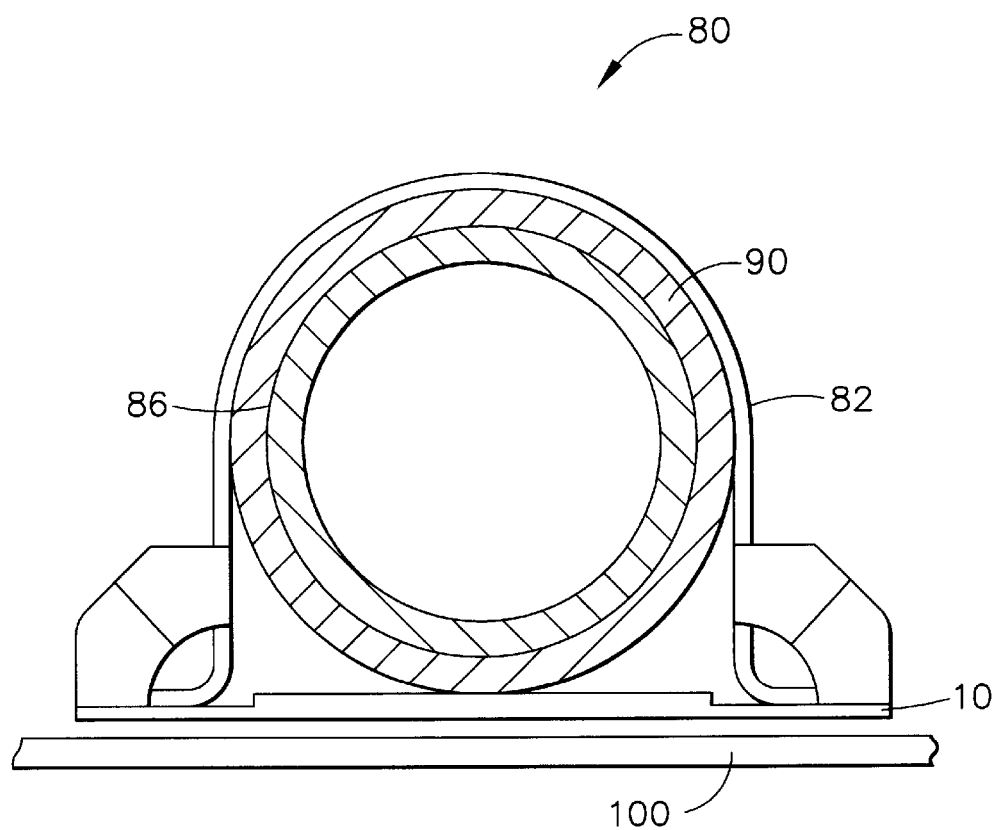
FIG. 4 is a cross-sectional view of the clamping assembly shown in FIG. 3.

FIG. 4 is a cross-sectional view of clamping assembly 80 including lower strap clamp 10 and upper strap clamp 82. Upper strap clamp 82 is formed around wear sleeve 90 which encircles tubing 86. Upper strap clamp 82 includes openings (not shown) which receive threaded fasteners 88 (shown in FIG. 3). Threaded fasteners 88 extend through the openings in upper strap clamp 82, through apertures 52 and 54 (shown in FIG. 2) and through openings (not shown) in a clamp bracket 100 to tighten to aircraft housing 84 (shown in FIG. 3). When clamping assembly 80 is fully installed, strap clamp 10 remains unbent and substantially flat.

The above described unitary strap clamp for securing a tubing to an aircraft engine housing is reliable, easily installed, and is machined. The strap clamp includes no welds which reduces the risk of the clamp failing due to high vibrational fatigue. As such a cost-effective and reliable clamp is provided.

While the invention has been described in terms of various specific embodiments, those skilled in the art will recognize that the invention can be practiced with modification within the spirit and scope of the claims.

What is claimed is:

1. A strap clamp comprising:
a unitary elongate body comprising a first portion, a second portion, and a third portion, said first portion identical with said third portion, said second portion extending between said first and third portions, said first portion comprising an upper surface, a lower surface and a thickness extending therebetween, said second portion comprising an exposed upper surface, a lower surface, and a thickness extending therebetween, said second portion having a pair of exposed sidewalls extending outwardly from the upper surface of the first portion and an upper surface of the third portion to the exposed upper surface thereof such that the second portion has a substantially constant width between the exposed sidewalls, said first portion further comprising a pair of opposing sidewalls, said second portion extending between said first portion sidewalls, said second portion lower surface substantially co-planar with said first portion lower surface, said second portion thickness greater than said first portion thickness and substantially constant within said second portion between said first and third portions, at least one of said first portion and said third portion further comprising an aperture extending therethrough, each said aperture sized to receive a fastener for securing said strap clamp to a structure.

2. A strap clamp in accordance with claim 1 wherein said elongate body is rigid.

3. A strap clamp in accordance with claim 1 wherein said second portion is rectangular in shape.

4. A strap clamp in accordance with claim 1 wherein said elongate body further comprises a plurality of said apertures.

5. A strap clamp in accordance with claim 4 wherein said elongate body comprises two said apertures.

6. A strap clamp in accordance with claim 1 wherein said elongate body is further comprised of stainless steel.

7. A clamping assembly comprising:
a first strap clamp comprising a unitary elongate body, said elongate body comprising a first portion, a second portion, and a third portion, said second portion extending between said first and third portions and, said first portion identical with said third portion and comprising an upper surface, a lower surface, and a thickness extending therebetween, said second portion comprising an exposed upper surface, a lower surface, and a thickness extending therebetween, said second portion having a pair of exposed sidewalls extending outwardly from the upper surface of the first portion and an upper surface of the third portion to the exposed upper surface thereof such that the second portion has a substantially constant width between the exposed sidewalls, said second portion lower surface substantially co-planar with said first portion lower surface, said second portion thickness larger than said first portion thickness and substantially constant within said second portion, at least one of said first portion and said third portion further comprising an aperture extending therethrough, said aperture sized to receive a fastener therethrough; and
a second strap clamp configured to attach to said first strap clamp using said first strap clamp aperture, such that a component is retained between said first and second clamps.

8. A clamping assembly in accordance with claim 7 wherein said second portion is rectangular in shape.

9. A clamping assembly in accordance with claim 7 wherein said elongate body further comprises a plurality of said apertures.

10. A clamping assembly in accordance with claim 9 wherein said elongate body comprises two said apertures.

11. A clamping assembly in accordance with claim 7 wherein said first strap clamp is further comprised of stainless steel.

12. A clamping assembly in accordance with claim 7 wherein said first strap clamp is rigid.

* * * * *

UNITED STATES PATENT AND TRADEMARK OFFICE
CERTIFICATE OF CORRECTION

PATENT NO. : 6,655,642 B1
DATED : December 2, 2003
INVENTOR(S) : Scott R. Zearbaugh It is certified that error appears in the above-identified patent and that said Letters Patent is hereby corrected as shown below:

Column 4,
Line 26, after "portions" delete "and".

Signed and Sealed this

Twenty-first Day of June, 2005

JON W. DUDAS
*Director of the United States Patent and Trademark Office*